(No Model.)
C. S. SHAW.
ANIMAL TRAP.
No. 428,966. Patented May 27, 1890.
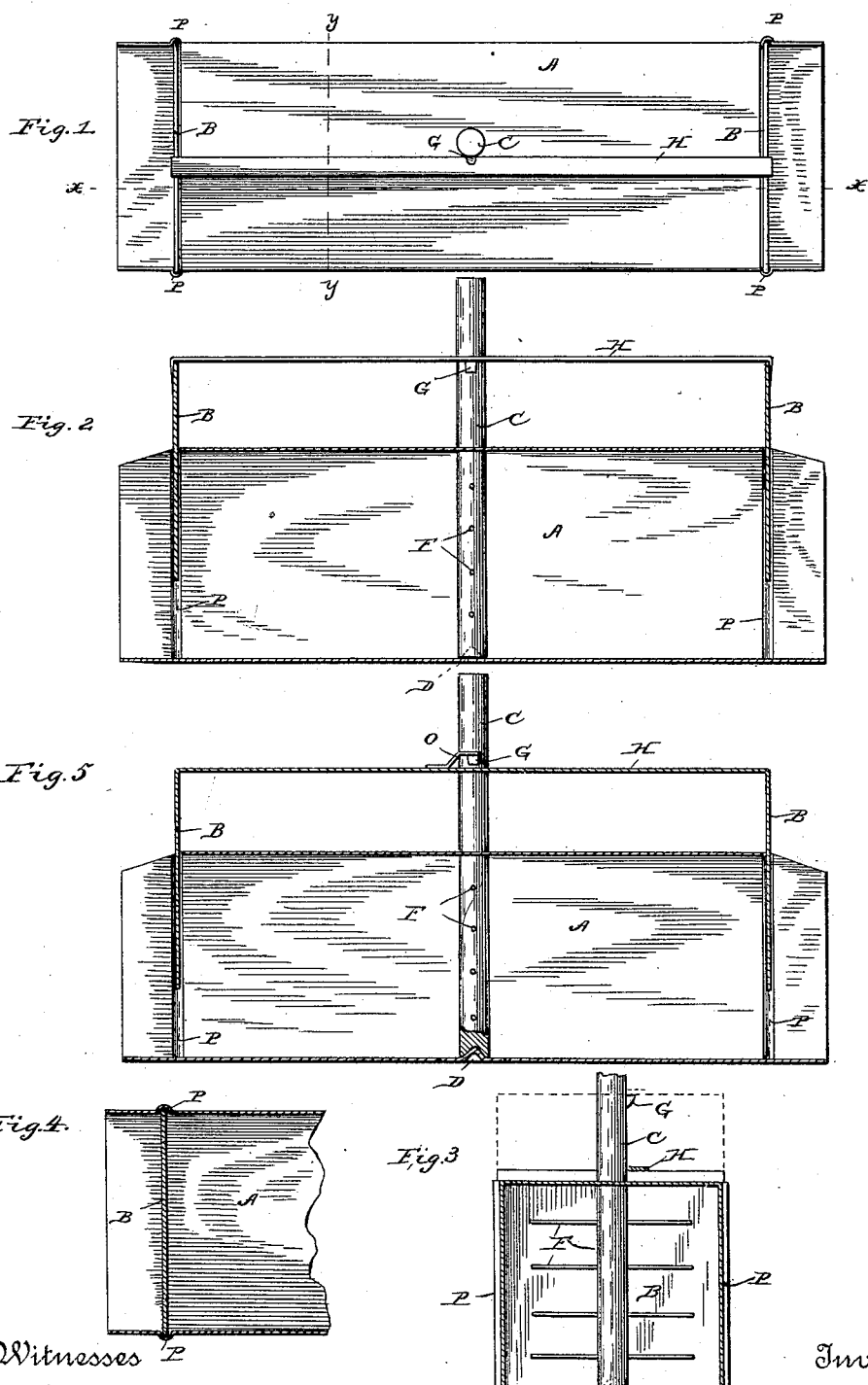
Witnesses
Harry S. Rohrer
W. T. Norton
Inventor
Caleb S. Shaw
By his Attorneys
Wiles & Greene

UNITED STATES PATENT OFFICE.

CALEB S. SHAW, OF FISHING CREEK, NEW JERSEY.

ANIMAL-TRAP.

SPECIFICATION forming part of Letters Patent No. 428,966, dated May 27, 1890.

Application filed January 30, 1890. Serial No. 338,616. (No model.)

*To all whom it may concern:*

Be it known that I, CALEB S. SHAW, a resident of Fishing Creek, in the county of Cape May and State of New Jersey, have invented certain new and useful Improvements in Animal-Traps; and I do hereby declare the following to be a full, clear, and exact description of the invention, such as will enable others skilled in the art to which it pertains to make and use the same.

This trap belongs to the class in which the animal is imprisoned without injury in a close compartment, and is intended for catching small animals of any kind. It is equally adapted to be used as a bait trap or to be set with or without bait in the runways of the animals.

In the drawings, Figure 1 is a plan of the trap. Fig. 2 is a section on the line $x\,x$, the trap being set. Fig. 3 is a section on the line $y\,y$, parts being broken away to show construction. Fig. 4 is an enlarged view of the ways for the end-gates. Fig. 5 is a view similar to Fig. 2, showing a modified construction.

In the drawings, A is a tube, preferably of sheet metal and having its bottom and sides projecting beyond its top.

B B are two metal end-gates which slide vertically in ways P in the inner faces of the sides of the trough or tube A. The top B of the tube is centrally perforated, and through the perforation passes a shaft C, whose lower end is revolubly mounted upon a bearing D upon the bottom of the tube. From that part of the shaft lying within the tube project a series of bars F in the same plane, which, when parallel to the axis of the tube, divide it into two passages; but when perpendicular to such axis bar the whole tube by projecting so far that no animal can pass without pushing them aside and in consequence rotating the shaft. Above the top B the shaft projects to a distance approximately equal to the depth of the tube, and upon one side near its upper end it is provided with a fixed lug G in the plane of the bars F. The end-gates project slightly above the top when they are closed, and are connected at their upper ends by a rigid bar H, one of whose edges is tangent to the shaft C. Now if this bar be raised with the attached end-gates and if the shaft be so turned that the lug thereon is beneath it the bar is supported and the trap is set. The bars within the tube, being in the plane of the lug, are also necessarily perpendicular to the axis of the tube, and thus, as above explained, force the passing animal to rotate the shaft; but such rotation carries the lug from beneath the bar H and permits the end-gates to fall, imprisoning the animal in a metallic box, which may then be immersed in water without injury for the purpose of drowning the animal. It is plain from the construction that it is immaterial in which direction the animal attempts to pass, and it may be added that as the bars within the tube are small at some distance apart and do not reach the tube-walls the tube appears to the animal to offer a practically free passage with obvious advantages. If bait be used, it is placed upon one or more of the bars within the tube, and evidently any attempt to remove it will, as before, rotate the shaft with like results. Nor does the use of the bait in any way lessen the effectiveness of the apparatus in entrapping any animal that may attempt to pass without disturbing the bait. As shown in Fig. 5, the tube may be an open trough, the top or cover of which connects the end-gates, and is provided with any suitable catch O to rest upon the lug, the bar H being omitted. I have made the tube of a single piece of sheet metal, the sides being corrugated, as shown in Figs. 1 and 4, to form ways for the end-gates, and I have also formed the end bearing for the shaft by pressing the bottom upward from below at the proper point, the shaft being hollow or correspondingly recessed at its lower end. The more important features of my invention, however, do not depend upon the use of any particular material nor upon following exactly the forms shown. For example, the tube may be of wood or netting, the bearing for the shaft may be varied, or the arms F may be replaced by any equivalent construction.

What I claim is—

1. The combination, with a tube open at each end to permit the passing of animals in either direction, of gates for closing said ends, a catch for holding both gates open, tube-obstructing bars secured in the middle portion of the tube to swing in either direction out of obstructing position, and means whereby such swinging may release said gates from said catch, substantially as set forth.

2. The combination, with an open tube, of a revoluble shaft crossing the interior of the tube near its middle and projecting through the wall of the tube, bars projecting from said shaft within the tube, a lug fixed to the shaft without the tube, end-gates adapted to close the ends of the tube, and a bar adapted to rest upon said lugs and hold the gates open until the shaft is rotated, substantially as set forth.

3. The combination, with the tube open at each end, of the gates moving in vertical ways in the sides of the tube, the revoluble shaft passing through the top of the tube and having a bearing upon the bottom thereof, the bars projecting from the shaft within the tube, the lug upon the shaft without the tube, and the rigid bar connecting the end-gates and adapted to rest upon said lug when the bars within the tube are transverse to the axis thereof.

In testimony whereof I have signed this specification in the presence of two subscribing witnesses.

CALEB S. SHAW.

Witnesses:
JAMES M. E. HILDRETH,
JAMES B. SHAW.